United States Patent
Xu et al.

(10) Patent No.: US 12,422,674 B2
(45) Date of Patent: Sep. 23, 2025

(54) HEAD MOUNTED AUGMENTED REALITY SYSTEM, APPARATUS AND DEVICE WITH FREEFORM SURFACED OPTICAL COMBINER

(71) Applicant: Firefly Dimension Inc., San Jose, CA (US)

(72) Inventors: Ke Xu, San Jose, CA (US); Peng Shao, San Jose, CA (US)

(73) Assignee: Firefly Dimension Inc., San Jose, CA (US)

( * ) Notice: Subject to any disclaimer, the term of this patent is extended or adjusted under 35 U.S.C. 154(b) by 0 days.

(21) Appl. No.: 16/907,070

(22) Filed: Jun. 19, 2020

(65) Prior Publication Data

US 2020/0400956 A1 Dec. 24, 2020

Related U.S. Application Data

(60) Provisional application No. 62/864,347, filed on Jun. 20, 2019.

(51) Int. Cl.
*G02B 27/01* (2006.01)

(52) U.S. Cl.
CPC ....... *G02B 27/0172* (2013.01); *G02B 27/017* (2013.01); *G02B 27/0176* (2013.01); *G02B 2027/013* (2013.01); *G02B 2027/0159* (2013.01)

(58) Field of Classification Search
CPC .................... G02B 27/0172; G02B 27/017
See application file for complete search history.

(56) References Cited

U.S. PATENT DOCUMENTS

| 6,172,657 B1 * | 1/2001 | Kamakura | ........... G02B 27/017 |
| | | | 345/5 |
| 7,492,330 B2 * | 2/2009 | Hata | ........................ H04N 5/64 |
| | | | 345/9 |

(Continued)

FOREIGN PATENT DOCUMENTS

| CN | 107111138 A | 8/2017 |
| CN | 107272184 A | 10/2017 |

(Continued)

OTHER PUBLICATIONS

Jingfei Ye, Lu Chen, Xinhua Li, Qun Yuan, and Zhishan Gao, "Review of Optical Freeform Surface Representation Technique and its Application," Optical Engineering, vol. 56, Issue 11 (Year: 2017).*

(Continued)

*Primary Examiner* — Bao-Luan Q Le
(74) *Attorney, Agent, or Firm* — Sheppard Mullin Richter & Hampton LLP

(57) ABSTRACT

An augmented reality device includes two optical combiners configured to correspond to two eyes of a user respectively, each of the two optical combiners comprising an internal surface for reflecting light from the image source to a respective eye of the user, wherein the internal surface is a freeform surface with a surface function that is based on an XY-polynomial including at least one multivariate monomial; an image source positioned above the eyes of the user to emit light onto the optical combiners, wherein the image source comprises two active displaying areas which are on two different planes; and a housing structure configured to maintain relative position and orientation of the optical combiners and the image source.

11 Claims, 11 Drawing Sheets

(56) References Cited

U.S. PATENT DOCUMENTS

| | | | |
|---|---|---|---|
| 9,170,425 B1* | 10/2015 | Harrison | G02B 27/0172 |
| 9,638,836 B1* | 5/2017 | Harrison | G02B 27/0172 |
| 9,928,629 B2 | 3/2018 | Benishti et al. | |
| 9,946,074 B2 | 4/2018 | Cakmakci et al. | |
| 10,317,690 B2 | 6/2019 | Cheng | |
| 10,495,879 B1* | 12/2019 | Ahuja | G02B 5/045 |
| 10,928,633 B1* | 2/2021 | Yuan | G02B 27/0172 |
| 2004/0227703 A1* | 11/2004 | Lamvik | G09G 3/3233 |
| | | | 348/E5.145 |
| 2007/0236800 A1* | 10/2007 | Cakmakci | G02B 27/0172 |
| | | | 359/630 |
| 2012/0120498 A1* | 5/2012 | Harrison | G06F 3/012 |
| | | | 359/630 |
| 2012/0154920 A1* | 6/2012 | Harrison | G02B 3/0056 |
| | | | 359/619 |
| 2015/0346494 A1* | 12/2015 | Tanaka | G02B 27/0172 |
| | | | 345/647 |
| 2016/0041394 A1* | 2/2016 | Tanaka | G02B 27/0176 |
| | | | 359/630 |
| 2016/0062123 A1* | 3/2016 | Tanaka | G02B 27/0172 |
| | | | 359/631 |
| 2016/0116742 A1* | 4/2016 | Wei | G02B 27/0176 |
| | | | 349/11 |
| 2016/0147069 A1* | 5/2016 | Tanaka | H01L 51/0097 |
| | | | 359/632 |
| 2017/0045742 A1 | 2/2017 | Greenhalgh et al. | |
| 2017/0184852 A1* | 6/2017 | Tanaka | G02B 27/0172 |
| 2017/0193706 A1* | 7/2017 | Lo | G06T 19/006 |
| 2017/0323615 A1* | 11/2017 | Hazra | G06T 11/60 |
| 2017/0343818 A1 | 11/2017 | Espie et al. | |
| 2018/0217632 A1* | 8/2018 | Tseng | G02B 27/0172 |
| 2019/0018247 A1 | 1/2019 | Gao et al. | |
| 2019/0064524 A1* | 2/2019 | Cobb | G02B 1/11 |
| 2019/0064526 A1* | 2/2019 | Connor | G02B 6/0073 |

FOREIGN PATENT DOCUMENTS

| | | |
|---|---|---|
| CN | 206638889 U | 11/2017 |
| CN | 109270694 A | 1/2019 |
| CN | 109425985 A | 3/2019 |

OTHER PUBLICATIONS

International Search Report and Written Opinion for Application No. PCT/US2020/038819, mailed on Sep. 21, 2020, 10 pages.
International Preliminary Report on Patentability for PCT Application No. PCT/US2020/038819, mailed on Dec. 30, 2021, 10 pages.
First Search for Chinese Application No. 202080045207.4 mailed on Jul. 28, 2023.
Third Office Action for Chinese Application No. 202080045207.4 mailed on Jul. 27, 2024.
Decision of Rejection for Chinese Application No. 202080045207.4 mailed on Feb. 28, 2025.

* cited by examiner

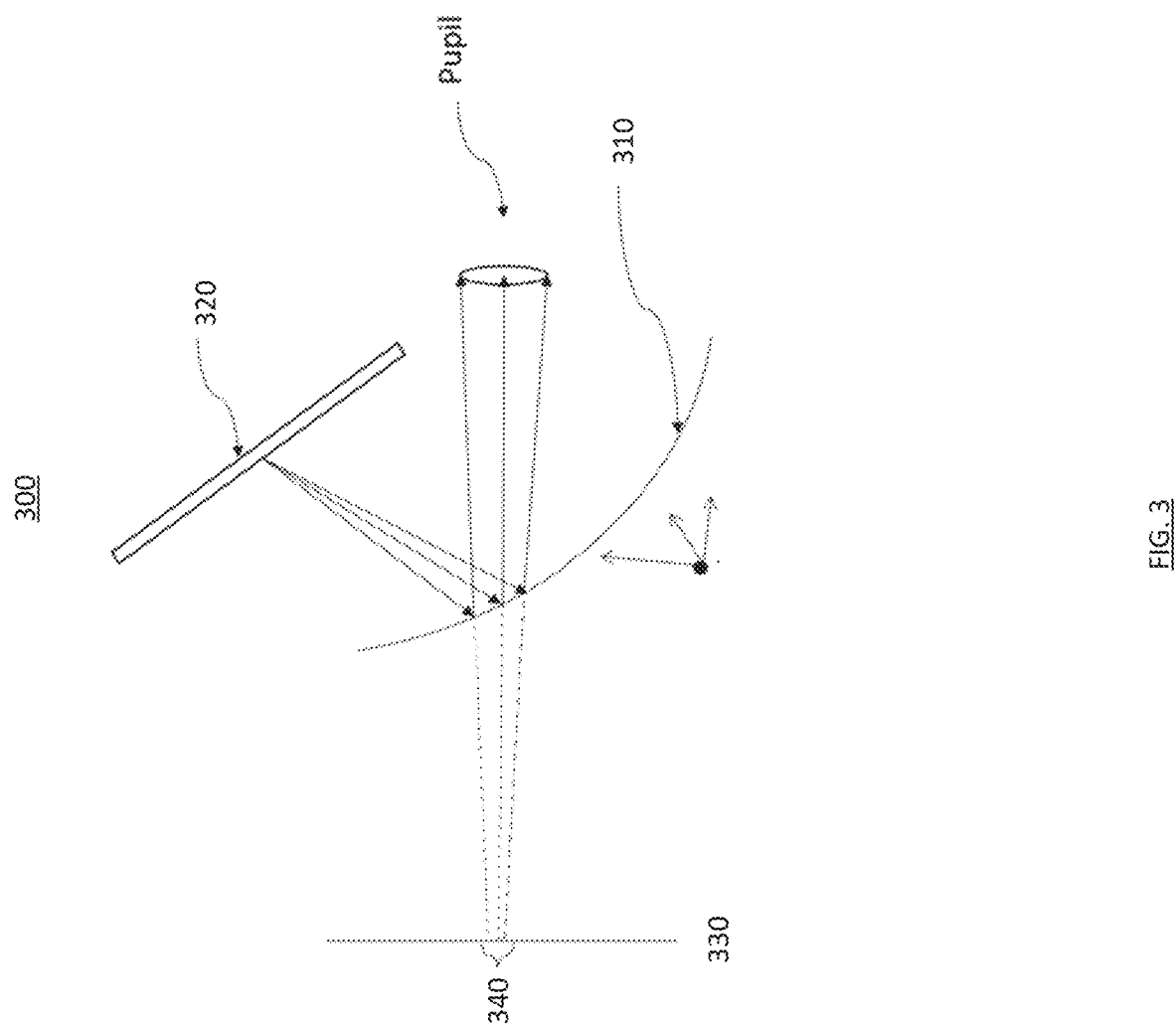

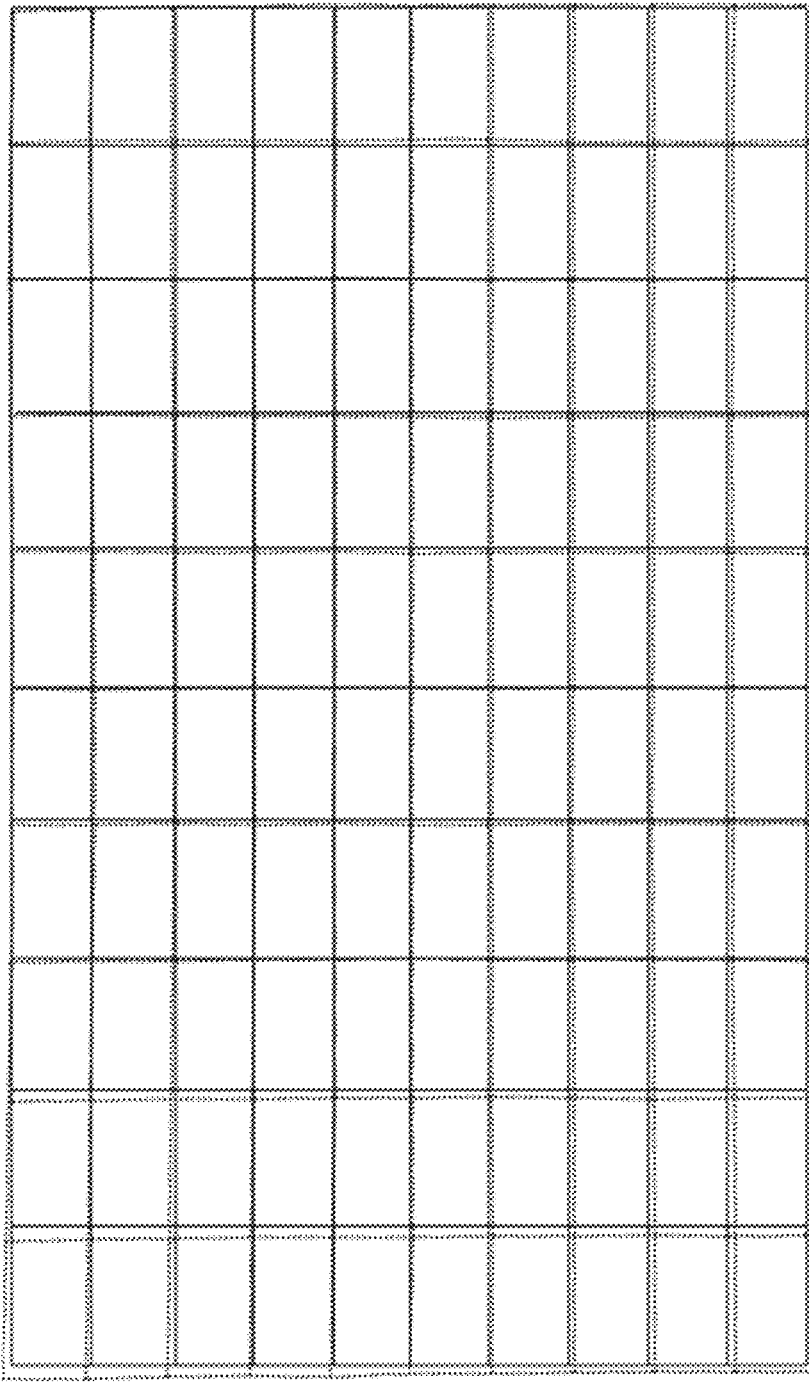

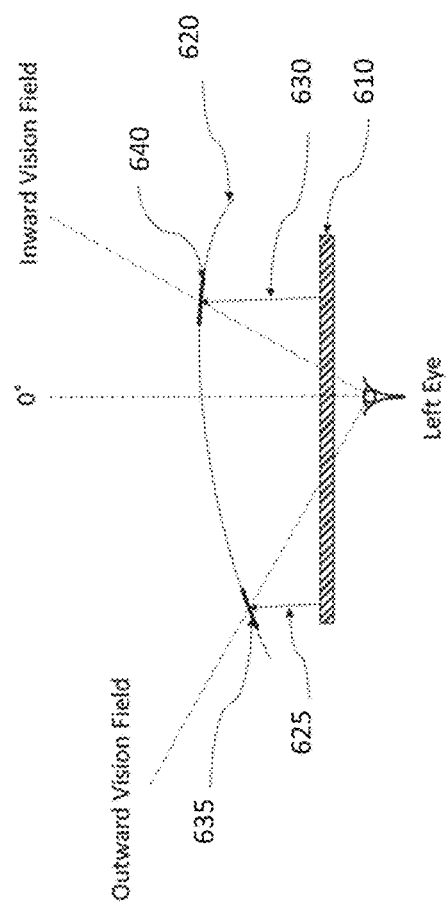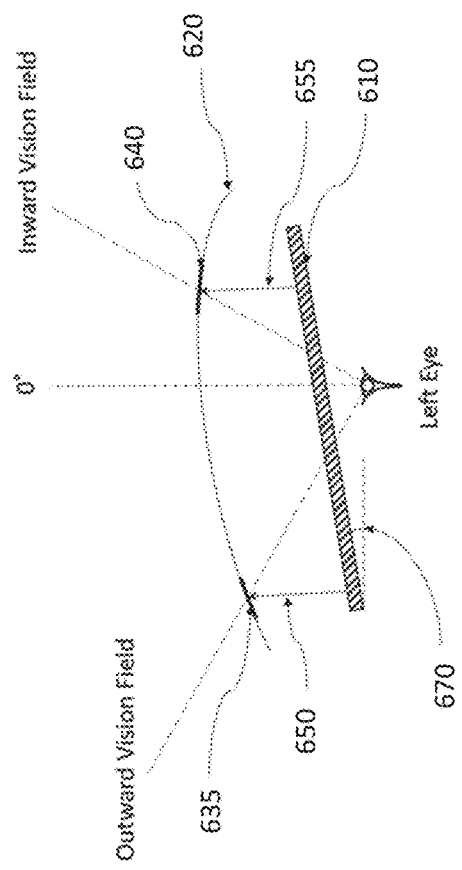

HEAD MOUNTED AUGMENTED REALITY SYSTEM, APPARATUS AND DEVICE WITH FREEFORM SURFACED OPTICAL COMBINER

RELATED APPLICATIONS

The present application is based on and claims priority to provisional patent application Ser. No. 62/864,347 filed on Jun. 20, 2019, the entire contents of which is incorporated herein by reference.

TECHNICAL FIELD

The disclosure relates generally to augmented reality systems, apparatuses, and devices.

BACKGROUND

Augmented reality (AR) is achieved by displaying a computer-generated image (also referred to as computer-generated content, virtual content, or a virtual image), over a real-world image observed by a viewer. In video-see-through (VST) augmented reality, the real-world image is first captured by an imaging device, e.g., a smartphone camera; then, computer-generated content is rendered on top of the captured real-world image; and, finally, the rendered image is viewed on a physical display media, e.g., a smartphone or tablet screen. In optical-see-through (OST) augmented reality, a light from the real world travels through an optical medium where the light is combined with computer-generated-image content such that a viewer receives the combined content at the same time. This disclosure includes a head-mount OST AR system.

SUMMARY

Various embodiments of the specification include, but are not limited to, systems, devices, and apparatuses for providing augmented reality, including head-mounted augmented reality devices.

In various embodiments, an augmented reality device may comprise two optical combiners, an image source, and a housing structure. In some embodiments, the two optical combiners are configured to correspond to two eyes of a user respectively, each of the two optical combiners comprising an internal surface for reflecting light from the image source to a respective eye of the user, and an external surface for allowing light from real-world to enter the respective optical combiner, wherein the internal surface is a freeform surface with a surface function that is based on an XY-polynomial including at least one multivariate monomial.

In some embodiments, the image source is positioned above the eyes of the user, the image source configured to emit light onto the internal surfaces of the two optical combiners, wherein the image source comprises two active displaying areas which are on two different planes.

In some embodiments, the housing structure is configured to maintain relative position and orientation of the two optical combiners and the image source.

In some embodiments, the image source comprises two independent display panels, and each of the two active displaying areas is a portion or the entirety of a respective one of the two independent display panels; and each independent display panel is associated with a respective one of the two optical combiners.

In some embodiments, each of display panels is angled about an orthogonal axis that runs normal to the respective display panel.

In some embodiments, each of the two active displaying areas is angled, about a vertical axis, an absolute value between zero and forty-five degrees. In some embodiments, each of the active displaying areas is angled, about a reference plane formed by a horizontal axis and a longitudinal axis, a value between forty-five degrees and ninety degrees.

In some embodiments, each of the active displaying areas is angled, about a longitudinal axis, an absolute value between zero and forty-five degrees.

In some embodiments, the image source comprises a Liquid Crystal Display, a Micro-LED display, an Organic Light Emitting Diode display, or an Active-Matrix Organic Light-Emitting Diode display.

In some embodiments, the internal surface is coated with a partially-reflective-partially-transmissive layer; the external surface is coated with an anti-reflective layer; and each of the two optical combiners further comprises a translucent substrate between the internal surface and the external surface.

In some embodiments, the surface function has parameters that include a vertex curvature, a conic constant, and a constant associated with the multivariate monomial, wherein the parameters are each non-zero.

In some embodiments, a surface function of the external surface of each of the two optical combiners is optimized by ray tracing based on the surface function of the internal surface and a refraction index of the respective optical combiner.

In some embodiments, the image source comprises a folded display having one or more folding lines that divide the display into two or more portions, and each of the two or more portions comprises an active displaying area. In some embodiments, one of the folding lines forms an angle with a reference plane formed by a longitudinal direction and a horizontal direction through the user's head, and the angle is of a value between zero and ninety degrees. In some embodiments, rear surfaces of two neighboring portions forms a folding angle of a value between 180 and 90 degrees.

In some embodiments, the two active displaying areas are curved. In some embodiments, each of the curved displaying areas has a cylindrical surface profile, a conic surface profile, a bi-conic surface profile, a toroidal surface profile, a surface profile described by a Zernike Polynomial, a surface profile described by a XY-polynomial, a Bezier surface profile, or a B-spline surface profile.

In some embodiments, the housing structure further comprises a headband configured to maintain the position and orientation of the two optical combiners and the image source relative to the user's head.

In some embodiments, the housing structure comprises an optical fixture configured to permit each of the two optical combiners to: rotate about a horizontal axis to be maintained in a rotated position to reflect light to the respective eye of the user or to hide an augmented image from the respective eye of the user. In some embodiments, the housing structure comprises an optical fixture configured to permit each of the two optical combiners to: be detached from the housing structure. In some embodiments, the housing structure further comprises a film-light valve that controls a level of transparency of a substrate of each of the two optical combiners.

In some embodiments, the augmented reality device further comprises a computational device connected to the image source, the computational device configured to generate images to be presented by the image source on the internal surfaces of the two optical combiners; and a power source configured to provide power to the image source and the computational device.

In various embodiments, a head mounted augmented reality device may comprise: an optical combiner positioned in front of an eye of a user, comprising an internal surface, wherein the internal surface is a freeform surface with a surface function that is based on an XY-polynomial including at least one multivariate monomial; an image source positioned above the eye of the user and between a position of the eye and the optical combiner in a longitudinal dimension, the image source configured to emit light onto the internal surface of the optical combiner, wherein the image source comprises an active displaying area that is angled, about a vertical axis through the user's head, an absolute value between zero and forty-five degrees; and a housing structure configured to maintain relative position and orientation of the optical combiner and the image source.

These and other features of the systems, devices, and apparatuses disclosed herein will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which:

FIG. 3 illustrates an RMS spot size of an augmented reality system, according to various embodiments of the present disclosure.

FIG. 4 illustrates a distorted image grid.

FIGS. 6A and 6B illustrate cross sections of a top view of a display and an optical combiner, according to various embodiments of the present disclosure.

DETAILED DESCRIPTION OF THE EMBODIMENTS

Figure 1:
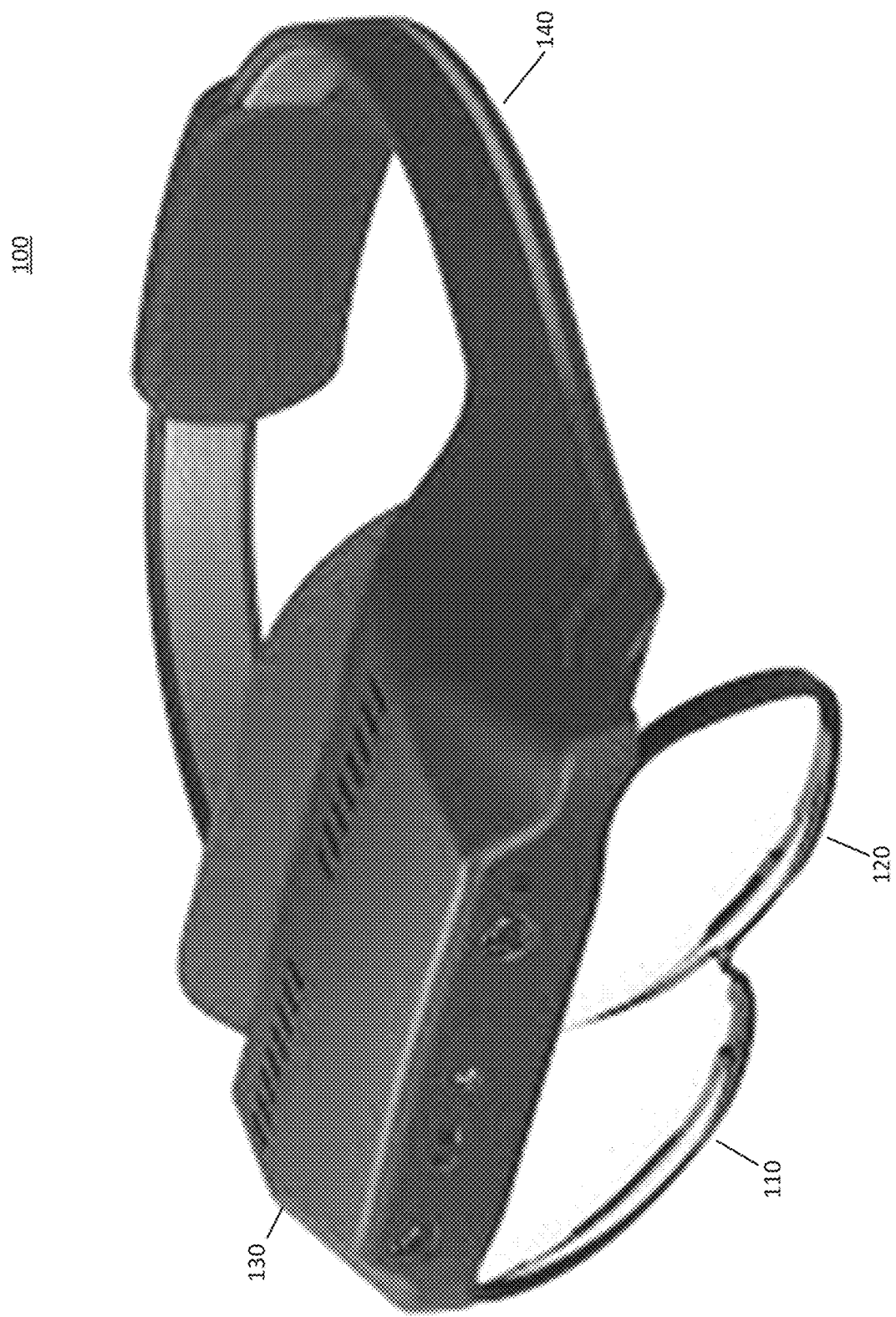
FIG. 1 illustrates an exemplary head-mounted augmented reality system.

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

An OST AR headset may offer its wearer a large field-of-view (FOV) in a light weight and compact form factor. An off-axis optical system may be comprised of freeform surfaces to achieve a large field-of-view in a relatively compact headset form factor. One of the primary design challenges in augmented-reality engineering is providing a large field-of-view, while not having the severely degraded image quality outside of the center area of the FOV that off-axis optical systems tend to have. This disclosure includes using XY-Polynomial with multivariate monomials as the surface function of the freeform surface to achieve a large FOV with high image quality and uniformity across the full range of FOV. The disclosure provides a binocular field of view that is greater than 50 degrees in the vertical direction and greater than 90 degrees in the horizontal direction.

In some embodiments, the OST AR headset may include two optical combiners, an image source, a computational device, a power source, and a housing structure. Each optical combiner may be positioned in front of one of the wearer's eyes and include AR FOV coverage for most of the human eye vision field. The OST AR headset may further include a partially reflective layer applied to one or more substrate surfaces of each or one of the optical combiners. The partially reflective layer may function to reflect light from the image source into the wearer's eyes while also allowing the light from the real world to pass through the combiner such that the light from the image source and the light from the real world may reach the wearer's eye simultaneously. The optical combiners may form a symmetrical pair with respect to a vertical reference plane formed by the vertical axis and the longitudinal axis from the center of wearer's head. The image source may be positioned above the wearer's eyes, facing away from the wearer's head, and between the eye position and the optical combiners in the longitudinal dimension. The image source may include one or a plurality of foldable or formable display panels. Each panel or a portion of each panel may project a computer-generated image to each respective eye of the wearer. The computational device may be functionally connected or communicatively coupled to the image source and generate images for the image source to project.

FIG. 1 illustrates an exemplary head-mounted augmented reality system 100. The head-mounted augmented reality system 100 comprises a first optical combiner 110, a second optical combiner 120, an electronics compartment 130, and a headband 140. In some embodiments, head-mounted augmented reality systems have only one optical combiner. The optical combiners 110, 120 of the head-mounted augmented reality system 100 may each comprise a substrate, an internal surface, and an external surface. The substrate may be transparent. In some embodiments, the transparency of the substrate may be variably adjusted. The internal surface and/or external surface of the optical combiners 110, 120 may be free-form surfaces.

In some embodiments, the optical combiners 110, 120 may be arranged in a compact way such that the longitudinal eye relief is smaller than 5.5 cm for a smaller longitudinal dimension of the optical assembly, but larger than 2 cm to provide enough space to accommodate user worn vision-correction or safety glasses.

The electronics compartment 130 may comprise a power source and a computational device. The computational device may be functionally connected or communicatively coupled with an image source to implement one or more programs and provide computer-generated images. In some implementations, the computational device may include a System-on-Chip that integrates a central processing unit, memory, secondary storage, and input/output ports. The SoC may further include a graphic processing unit. In some implementations, the computer-generated images are stereoscopic images rendered from two perspectives in a 3D scene such that, when observed by the wearer, the stereoscopic images create a 3D perception. In some implementations, the computational device may further include a wireless connectivity module which provides wireless connectivity functionalities, for example, Wi-Fi, Bluetooth, and cellular network. Furthermore, the computational device may be functionally connected to the power source. The power source may comprise one or more batteries. In some implementations, the power source may be a rechargeable Lithium-ion battery.

The headband 140 may be used to position or secure the head-mounted augmented reality system 100 to a wearer's head. In some embodiments, the headband 140 may be adjustable.

The head-mounted augmented reality system 100 may also comprise an optical fixture, a display fixture, and/or one or more film light valves. An optical fixture may rigidly connect to the optical combiners 110, 120 and maintain the relative position and orientation of the optical combiners 110, 120 with respect to an image source within a design tolerance. In some implementations, the optical fixture may be allowed to rotate around a horizontal axis to lift the optical combiners 110, 120 up and functionally switch between an augmented reality mode and non-disturbing mode. Under augmented reality mode, the optical combiners 110, 120 are maintained in the designed position so as to reflect the light into the wearer's eyes. Under non-disturbing mode, the optical combiners 110, 120 are maintained out of the wearers natural field-of-view such that the augmented images are hidden from the wearer. In some implementations, an optical fixture may include a detachable structure such that when the optical combiners 110, 120 or the optical fixture itself is damaged, the assembly of the optical combiners 110, 120 and optical fixture can be detached from the housing structure, which holds the head-mounted augmented reality system 100 together, and replaced with a new assembly.

A display fixture may rigidly connect to an image source and maintain the position and orientation of the image source within a design tolerance. An image source may provide computer-generated images to the wearer by projecting light onto the internal surfaces of the optical combiners 110, 120. An image source may comprise one or more display panels that are positioned between the optical combiners 110, 120 and the headband 140. A display panel may include, for example, the following types: a Liquid Crystal Display, a Micro-LED display, an Organic Light Emitting Diode display, or an Active-Matrix Organic Light-Emitting Diode display.

In some embodiments, an image source may include two independent planar display panels, each placed above eyes of the wearer and facing outward away from the wearer. Each of the display panels may be further arranged such that the light emitted from the display is reflected by the internal surface of the corresponding optical combiner 110, 120 to the corresponding eye to form a virtual image. Each display panel may further contain an active displaying area such that light emitted by pixels within the area is reflected to form the virtual image within a defined field-of-view.

One or more film light valves may be included in the head-mounted augmented reality system 100 to actively control the transparency of one or more of the optical combiners 110, 120, and may be functionally connected with the computational device. Each film light valve may be placed behind the corresponding optical combiner 110, 120 and further away from the wearer's eyes in the longitudinal direction (orthogonal to the horizontal and vertical directions). Furthermore, the film light valves may be positioned on the light path of the real-world image within the defined field of view such that the amount of real-world light allowed to reach the wearer's eyes can be actively regulated based on the ambient light intensity. In some embodiments, the film light valve may be a liquid crystal light valve. The real-world light traveling through the liquid crystal light valve may first pass through a first filter that polarizes the real-world light to one direction and then pass through a second filter filled with liquid crystals. By controlling the voltage applied to the second filter, it gives different intensity of the light coming out.

Figure 2:
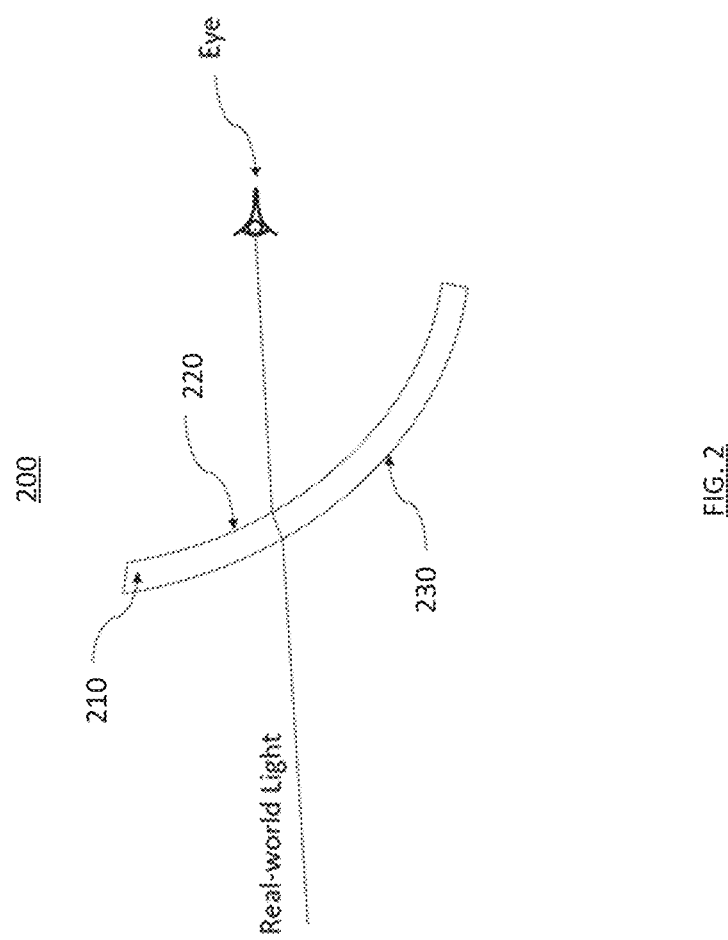
FIG. 2 illustrates a cross section of a side view of a combiner, according to various embodiments of the present disclosure.

FIG. 2 illustrates a cross section of a side view of a combiner 200, according to various embodiments of the present disclosure. In some embodiments, the combiner 200 may be implemented in an augmented reality system such as the head-mounted augmented reality system 100 of FIG. 1. As illustrated, the combiner 200 comprises a substrate 210, an internal surface 220, and an external surface 230.

The internal surface 220 is a concave surface that faces the wearer's eye. The external surface 230 is a convex surface that is located behind the first surface and is positioned further away from the wearer's eye. In some embodiments, the substrate 210 may be any translucent materials, for example, glass, or a polymer, such as PMMA or polycarbonate. The internal surface 220 may reflect the light from an image source to the wearer's eye and magnifies the image. In some embodiments, a partially-reflective-partially-transmissive coating is applied on the internal surface 220. In some embodiments, an anti-reflective coating is applied onto the external surface 230 to reduce the undesired double image caused by the reflection of the light from the image source on the external surface 230. The geometries within the optical clear aperture of both the internal surface 220 and external surface 230 may be further defined in a local coordinate system by a surface function, which contains an XY polynomial added to a base conic. One form of this surface function is given below:

$$z = \frac{cr^2}{1 + \sqrt{1-(1+k)c^2r^2}} + \sum c_j x^m y^n \quad (1)$$

In this equation, z is the sag of the surface parallel to the z-axis, c is the vertex curvature, k is the conic constant, r equals $\sqrt{(x^2+y^2)}$, $c_j$ is the coefficient of j-th monomial $x^m y^n$ where exponents m and n are non-negative integers. Furthermore, the surface function according to this disclosure may contain at least one multi-variate monomial $c_j x^m y^n$ that has non-zero coefficient $c_j$ and positive exponents, m and n. The inclusion of the multi-variate monomials allows for additional degrees of freedom, enabling many potential advantages, such as reduced optical aberrations and overall system miniaturization. The monomials with higher orders can add more degrees of freedom to the optical system and significantly improve the image quality outside the center portion of the field-of-view. In some embodiments, the monomials with higher orders may be removed from the surface function to reduce the complexity of the surface geometry and achieve a lower manufacturing cost. The surface function of the internal surface 220 may be optimized such that the root-mean-square spot size of the optical design is minimized to correct the off-axis aberrations of the virtual image.

FIG. 3 illustrates an RMS spot size 340 of an augmented reality system 300. The augmented reality system 300 comprises an internal surface 310 and an image source 320. The internal surface 310 may be an internal surface of an optical compiler. The image source 320 may be one or more displays.

The design of the optical surface geometry according to this disclosure may be constructed as an optical system optimization problem, based on the real ray tracing. During the ray tracing of the optical system in this disclosure, bundles of light rays emitted from sample points on the image source 320 are simulated (traced). The light rays are reflected by the internal surface 310 and enter the pupil from an angle within the FOV. The reflected light rays have corresponding hypothetical opposite rays converging on a virtual image plane 330. The RMS spot size 340 of each converging ray bundle reflects the image quality of the corresponding local spot that a user (wearer) observes on the virtual image plane 330. The image quality can be improved by reduction of the RMS spot size 340. During the course of implementation, an error function, which is a single positive number including weighted image errors, may be minimized by adjusting parameters of the optical system, including c, k, $c_j$, position and orientation of the local coordinate system in which the surface function is defined, and with respect to the pupil, and position and orientation of the image source 320 with respect to the pupil. When the error function is minimized, the RMS spot size 340 is minimized.

The following Table 1 of RMS spot sizes provides RMS spots sizes for different optical surface profiles, from which comparison of the image quality of first optical surface designs using different surface profiles can be obtained. The surface profiles in the table are of the common types typically employed in optical lens designs, and include, for example, Aspheric, Zernike polynomial, XY-Polynomial excluding multivariate monomial terms, and XY-Polynomial including multivariate monomial terms. Table 1 provides the RMS spot sizes sampled in the left eye scenario where the ray bundles enter the pupil on the horizontal plane from three angles (fields): −20°, 0°, 40°. Both Aspheric and Zernike designs failed to reach the 40° field due to their insufficient optical power. While both XY-Polynomial designs achieve a wide field-of-view, the one including multivariate monomials has a significant improvement on the RMS spot size (and thus the quality of the image) for all fields.

TABLE 1

RMS Spot Sizes for Different Optical Surface Profiles

| RMS Spot Size (mm) | 0° | −20° | 40° |
|---|---|---|---|
| XY-Polynomial with multivariate monomials | 0.61571 | 0.23522 | 0.43646 |
| XY-Polynomial without multivariate monomials | 1.3540 | 0.45230 | 0.96477 |
| Zernike Polynomial | 1.3147 | 0.96568 | N/A |
| Aspheric | 1.0762 | 1.2398 | N/A |

FIG. 4 illustrates a distorted image grid 400. When real-world light enters an optical combiner through an external surface, it is transmitted through the substrate and exits at the internal surface. In the optical path, the light is refracted twice, resulting in the distortion of the real-world image perceived by the wearer. The surface function of the external surface may be optimized by using real ray tracing and is based on the design of the internal surface and the refraction index of the combiner material, such that the difference between a light ray bundle from real world within the field-of-view and traveling through the optical combiner and that not traveling through the optical combiner, is minimized. In FIG. 4, the distorted image grid 400 comprises a perceived image overlaying a real-world image. The grid with solid lines represents a real-world image, and the grid with dashed lines shows the perceived image that the wearer may observe through an optical combiner on the real-world image without the aforementioned design optimization to minimize the distortion on the real-world image.

Figure 5A:
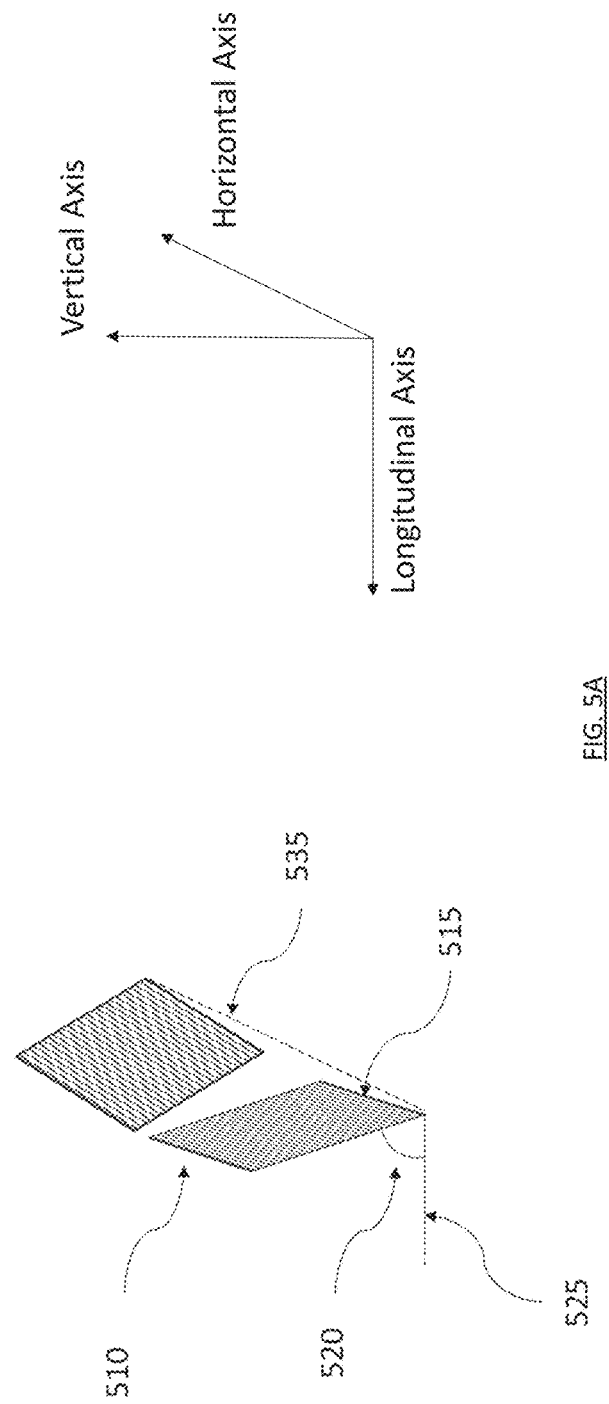
FIGS. 5A and 5B illustrate reference planes and angles for relative placement of one or more display panels, according to various embodiments of the present disclosure.
Figure 5B:
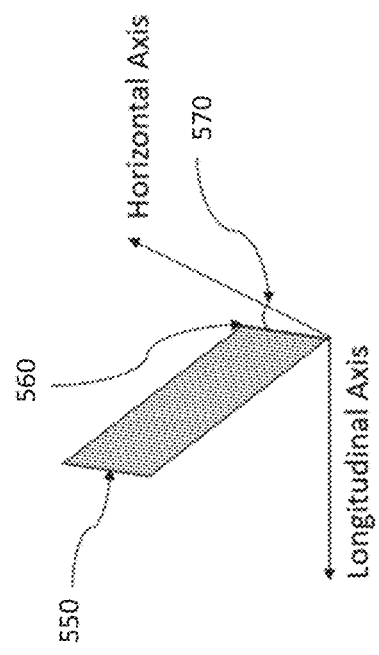

FIGS. 5A and 5B illustrate reference planes and angles for relative placement of one or more display panels, according to various embodiments of the present disclosure. The reference planes and angles may be implemented in selecting an implementation-specific orientation and/or location of one or more display panels. As illustrated, FIG. 5A comprises two displays 510, a lower edge 515, a first angle 520, a first reference line 525 parallel to a longitudinal axis through the center of wearer's head, a second reference line 535 parallel to a horizontal axis through the center of wearer's head. As illustrated, FIG. 5B comprises a display 550, a lower edge 560, and a second angle 570.

In some embodiments, the two displays 510 make up an image source for an AR system, such as the head-mounted augmented reality system 100 of FIG. 1. As shown in FIG. 5A, the two displays 510 may be in two different planes. For example, the two displays 510 are not coplanar. Additionally, each of the two displays 510 may be arranged with respect to a first reference plane formed by the first reference line 525 and the second reference line 535. Each of the two displays 510 may be planar, or may be oriented based on a rotation about a horizontal axis through the center of wearer's head, a vertical axis through the center of wearer's head, a longitudinal axis through the center of wearer's head, horizontal axes parallel to the horizontal axis through the center of wearer's head, vertical axes parallel to the vertical axis through the center of wearer's head, and/or longitudinal axes parallel to the longitudinal axis through the center of wearer's head. The longitudinal axis, horizontal axis and vertical axis shown in FIG. 5A may not necessarily the same as those in FIG. 5B. The axes of coordinate systems in FIG. 5A and FIG. 5B may be parallel to each other respectively, but may run through different origins. For example, as shown in FIG. 5B, the display 550 may be angled about a vertical axis through a vertex of the display 550. The active displaying area in each of the two displays 510 may be a portion or the entirety of each display. Each of the two displays 510 has a lower edge 515 coinciding with the first reference plane. The display surface is arranged such that the display surface forms a first angle 520 with the first reference plane at the lower edge 515. In some embodiments, the first angle 520 may be larger than 45 degrees and smaller than 90 degrees to achieve a smaller longitudinal footprint of the display.

As shown in FIG. 5B, the display 550 may comprise either one of the two displays 510, or may comprise a different display. The display 550 is further arranged such that the lower edge 560 and a horizontal axis forms a second angle 570 in a second reference plane formed by the horizontal axis and a longitudinal axis and the second angle 570 is greater than −45 degrees (i.e., negative 45 degrees) and smaller than 45 degrees. As a result, the system has an additional degree of freedom to achieve improved image quality. The origin of the coordinate system formed by the horizontal axis, longitudinal axis and a vertical axis (not shown) may be a vertex of the display 550, which may be positioned at a distance (e.g., 1 inch, 1.5 inches, 2 inches, etc.) from the center of the wear's head.

FIGS. 6A and 6B illustrate cross sections of a top view of a display 610 and an optical combiner 620, according to various embodiments of the present disclosure. As illustrated, the optical combiner 620 has a first local curvature 635 and a second local curvature 640 that correspond to an outward vision field and inward vision field, respectively. As illustrated in FIG. 6A, the optical combiner 620 is separated from the display 610 by a first distance 625 and second distance 630. As illustrated in FIG. 6B, the optical combiner 620 is separated from the display 610 by a third distance 650 and a fourth distance 655. As is illustrated, between FIG. 6A and FIG. 6B, the display 610 is rotated about the vertical axis an angle 670, resulting in the third distance 650 being closer in magnitude to the fourth distance 655 than the first distance 625 is to the second distance 630. In some embodiments, the minimum distance between the display 610 and the first local curvature 635 may be set to be equal to the minimum distance between the display 610 and the second local curvature 640, based on the angle 670.

Due to the asymmetrical nature of the human vision field for each eye, the design of large field-of-view optical systems typically distributes the field-of-view per eye asymmetrically as well, for example, with horizontal inward (toward nose from vertical meridian of each eye) field-of-view smaller than the outward (toward temporal from vertical meridian of each eye) field-of-view. As a result, when the display is positioned with its lower edge coincident with horizontal axis, the local optical system corresponding to the outer field of vision has a shorter object distance than that of the inner field of vision. Consequently, the first local curvature 635, which corresponds to the outer field, may require a much larger optical power to form a virtual image on the image plane, when compared to the second local curvature 640, which corresponds to the inner field. By introducing the angle 670, the additional degree of freedom can potentially alleviate the constraint on the first local curvature 635 and therefore provide improved image quality.

Table 2 below presents the RMS spot sizes for the system with and without the angle 670. The results of the RMS spot sizes demonstrate a marked improvement of the image quality by introducing the angle 670 into the positioning of the display 610.

TABLE 2

RMS Spot Sizes Comparison between Display Placements with and without Rotation

| Spot diagram RMS (mm) | 0° | −25° | 45° | Average |
|---|---|---|---|---|
| without rotation | 0.69203 | 0.86912 | 0.67302 | 0.744723 |
| with rotation | 0.57108 | 0.77305 | 0.4182 | 0.587443 |

Figure 7A:
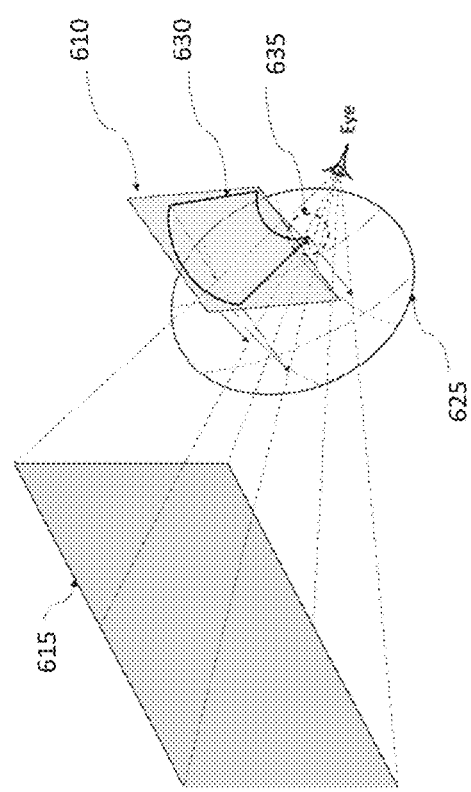
FIGS. 7A and 7B illustrate the placement of a display relative to a third axis, according to various embodiments of the present disclosure.
Figure 7B:
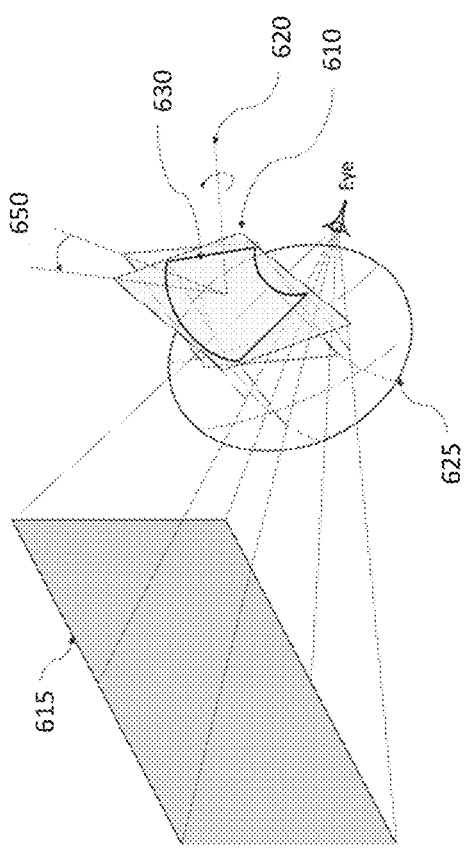

FIGS. 7A and 7B illustrate the placement of a display 710 relative to a third axis 620, according to various embodiments of the present disclosure. FIG. 7A includes an ideal active displaying area 630, associated with the virtual image 615, that extends outside the display 610 at the extension location 635.

As illustrated in FIGS. 7A and 7B, the display 710 may be rotated by a third angle 650—in addition to, or in lieu of, the rotations described for FIGS. 5A, 5B, 6A, and 6B—around an orthogonal axis 620 that runs normal to the surface of the display 610. Due to off-axis nature of the proposed optical systems, the image shown on the display 610 may be distorted when reflected by an internal surface of an optical combiner 625. As a result, an ideal active displaying area corresponding to an undistorted virtual image in the defined field-of-view may be an irregular shape that lies on the plane of the display 610, but is beyond its boundary. In order to accommodate such a situation, the display 610 is rotated the third angle 650 to contain the shape of the ideal active displaying area within the display 610.

Figure 8:
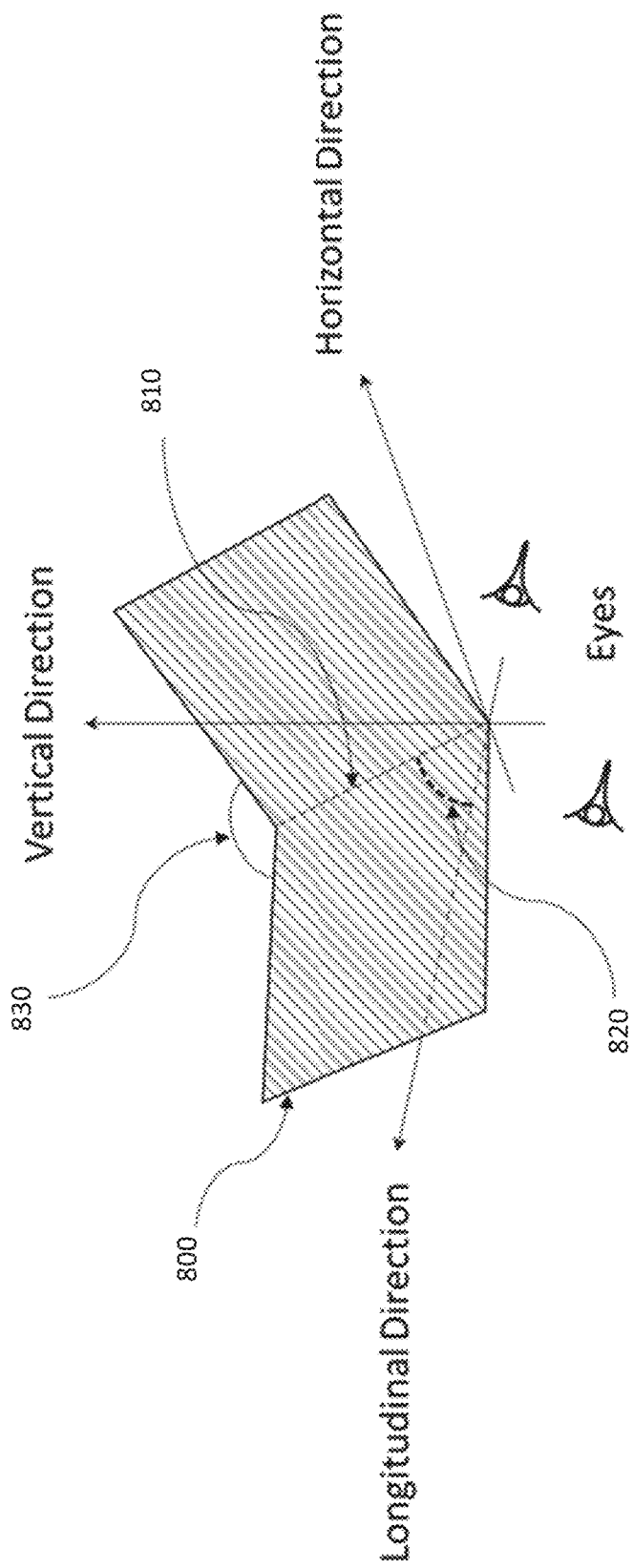
FIG. 8 illustrates a folded display with a single folding line, according to various embodiments of the present disclosure.

FIG. 8 illustrates a folded display 800 with a single folding line 810, according to various embodiments of the present disclosure. In some embodiments, the folded display 800 may be referred to as a "foldable display." In some embodiments, the folded display 800 may include a plurality of folding lines that do not intersect each other within the physical boundary of the folded display 800. The folded display 800 may comprise one or a plurality of active display areas. In some embodiments, the folded display 800 is arranged in an augmented reality system such that the active display areas face outward and away from the wearer's head in longitudinal direction. In some embodiments, the folded display 800 may be implemented in an augmented reality system such as the head-mounted augmented reality system 100 of FIG. 1. Active display areas may emit light that is reflected by an internal surface on a corresponding optical combiner and enters a corresponding eye of a wearer to form an entire virtual image, or a portion of a virtual image, within a defined field-of-view for that eye.

In some embodiments, the folded display 800 may have the single folding line 810 that divides the display into two portions. The single folding line 810 may form a first angle 820 with a first reference plane that is formed by a longitudinal direction and a horizontal direction. The first angle 820, measured in degree, may be any degree that is larger than 0° and smaller than 90°. The single folding line 810 may further coincide with a second reference plane that is formed by a longitudinal direction and a vertical direction. Each of the two portions of the folded display 800 further has a rear surface that is on the opposite side of the surface that contains the active displaying area. The two portions of the folded display 800 may form a second angle 830 at the folding line. The second angle 830 may be any degree that is smaller than 180° and larger than 0°. In some embodiments, the two portions of the folded display 800 are curved. The surface profile of the active displaying area in each of the two curved portions may be in many forms, including but not limited to, cylindrical surfaces, conic surfaces, Bezier surfaces, and B-spline surfaces.

Figure 9:
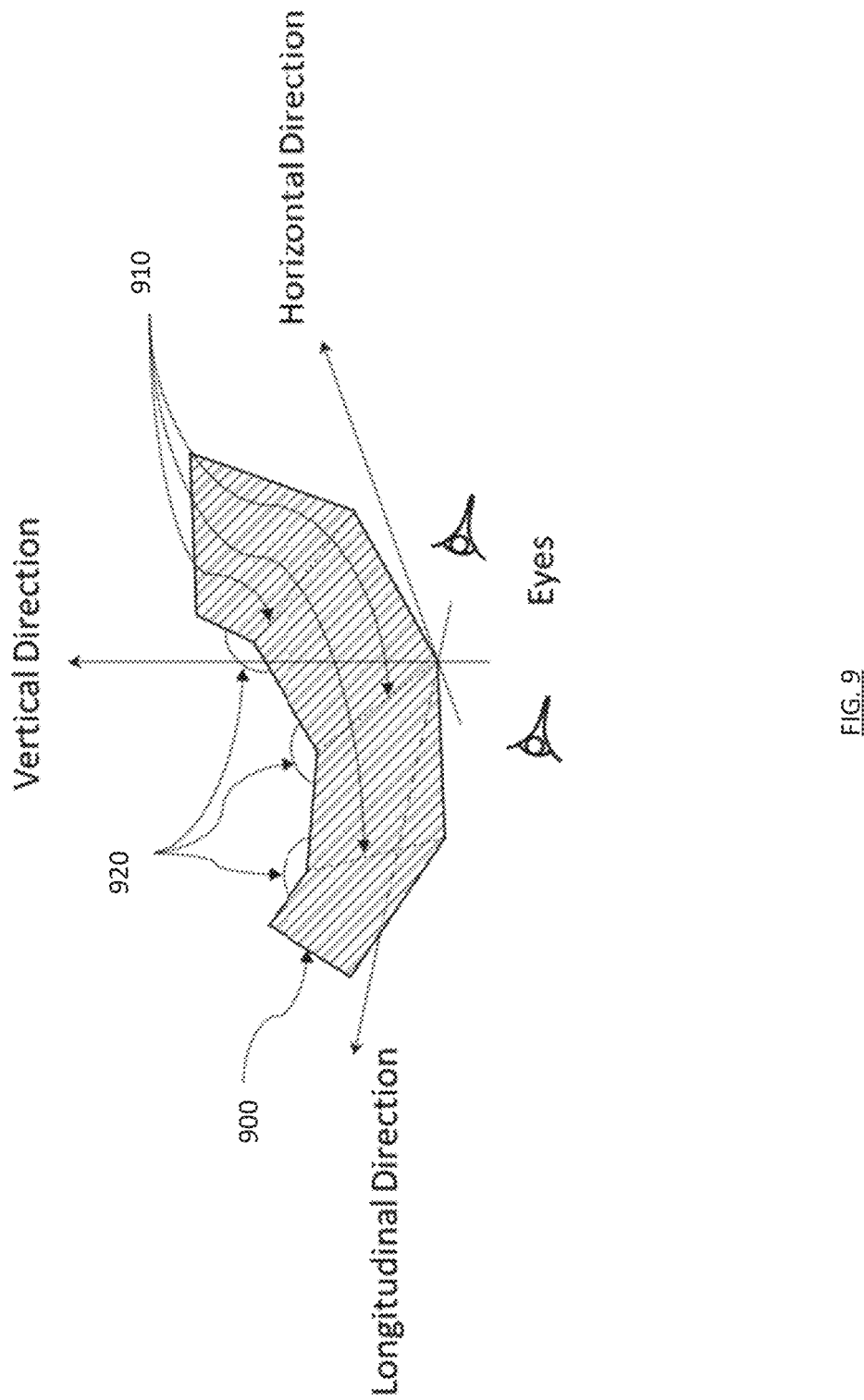
FIG. 9 illustrates a folding display with three folding lines, according to various embodiments of the present disclosure.

FIG. 9 illustrates a folded display 900 with three folding lines 910, according to various embodiments of the present disclosure.

The folding lines 910 divide the folded display 900 into N+1 portions, where N is the number of the folding lines. Each of the portions further has a rear surface that is on the opposite side of the surface that contains the active displaying area. In some embodiments, the portions are non-planar; and, consequently, every two neighboring rear surfaces forms a folding angle 920 at the shared folding line, and each folding angle 920, measured in degree, may be any degree that is smaller than 180° and larger than 90°. In some embodiments, the portions are curved. The surface profile of the active displaying area in each of the curved portions may be in many forms, including but not limited to, cylindrical surfaces, conic surfaces, Bezier surfaces, and B-spline surfaces.

Figure 10A:
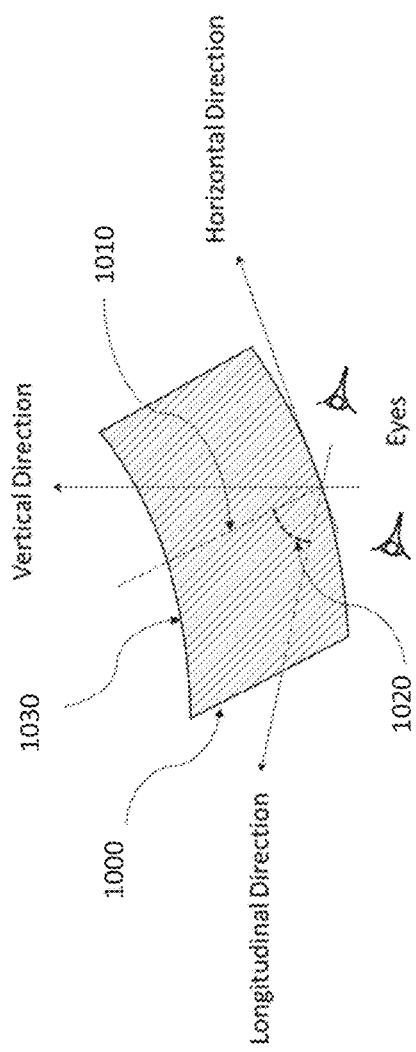
FIGS. 10A and 10B illustrate single curved displays, according to various embodiments of the present disclosure.
Figure 10B:
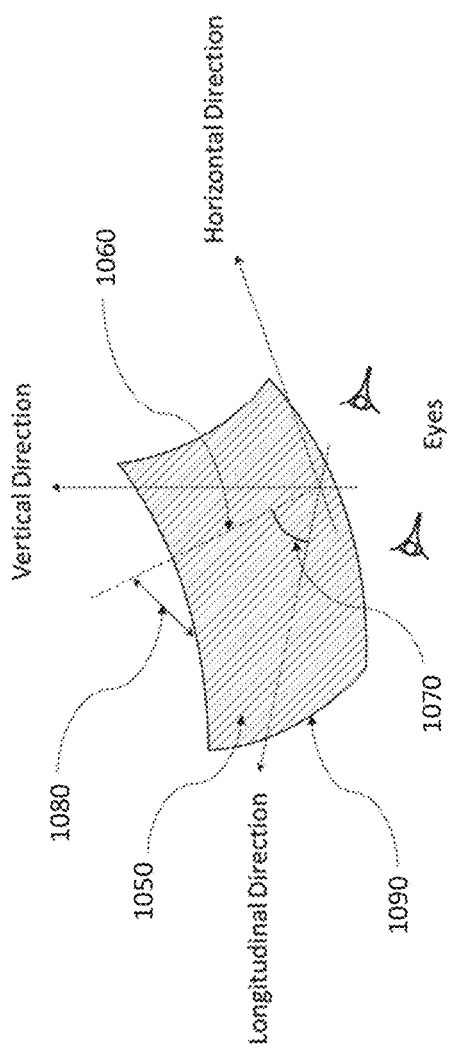

FIGS. 10A and 10B illustrate single curved displays 1000, 1050, according to various embodiments of the present disclosure. In some embodiments, one or more of the single curved displays 1000, 1050 may be implemented as an image source in an augmented reality system such as the head-mounted augmented reality system 100 of FIG. 1. As illustrated, FIG. 10A includes a single curved display 1000 comprising a first axis 1010, a first angle 1020, and a base curve 1030. As illustrated, FIG. 10B includes a single curved display 1050 comprising a second axis 1060, a second angle 1070, a first radius 1080, and a base curve 1090.

In some embodiments, one of the curved displays 1000, 1050 may be integrated into an augmented reality system, and have an image-displaying surface arranged to face outward in the longitudinal direction away from a wearer's head. An image displaying surface may further include at least one active displaying area such that light emitted by pixels within each of the one or more active displaying areas is reflected by a corresponding internal surface of an optical combiner to form a virtual image within a defined field-of-view of a corresponding eye. By having a curved display surface, the optical system can have additional degrees of freedom such that the position of a local displaying area can be optimized against the corresponding local optical system. As a result, such design can further relieve the requirement of the optical power on the local curvature of an internal surface of an optical combiner, and achieve a better image quality across an entire defined field-of-view. The surface profile of an active displaying area, included within a single curved display 1000, 1050, may be in many forms defined in a local coordinate system. For example, a surface profile may be a portion of a cylindrical surface, a portion of a conic surface, a portion of a bi-conic surface, a portion of a toroidal surface, a portion of a surface described by a Zernike Polynomial, a portion of a surface described by a XY-polynomial, a portion of Bezier surface, or a portion of B-spline surface.

As illustrated in FIG. 10A, the single curved display 1000 makes up an image source, and has two active displaying areas that are divided by the first axis 1010. Each active displaying area may emit light that is reflected by a corresponding optical combiner to a corresponding eye. The surface profile of the surface within each active displaying area may be, for example, a cylindrical surface that is formed by swiping a base curve along the first axis 1010. The first axis 1010 may further coincide with a vertical reference plane formed by a vertical direction and a longitudinal direction, and further form the first angle 1020 with the longitudinal direction. The first angle 1020, measured in degree, may be any degree that is greater than 0° and less than 90°.

As illustrated in FIG. 10B, the single curved display 1050 makes up an image source, and has two active displaying areas that are divided by the second axis 1060. Each active displaying area may emit light that is reflected by a corresponding optical combiner to a corresponding eye. The surface profile of the surface within each active displaying area may be, for example, a toroidal surface that is formed by revolving a base curve around the second axis 1060 with the first radius 1080. The second axis 1060 may further coincide with a vertical reference plane formed by a vertical direction and a longitudinal direction, and further form the second angle 1070 with the longitudinal direction. The second angle 1070, measured in degree, may be any degree that is greater than 0° and less than 90°.

Figure 11:
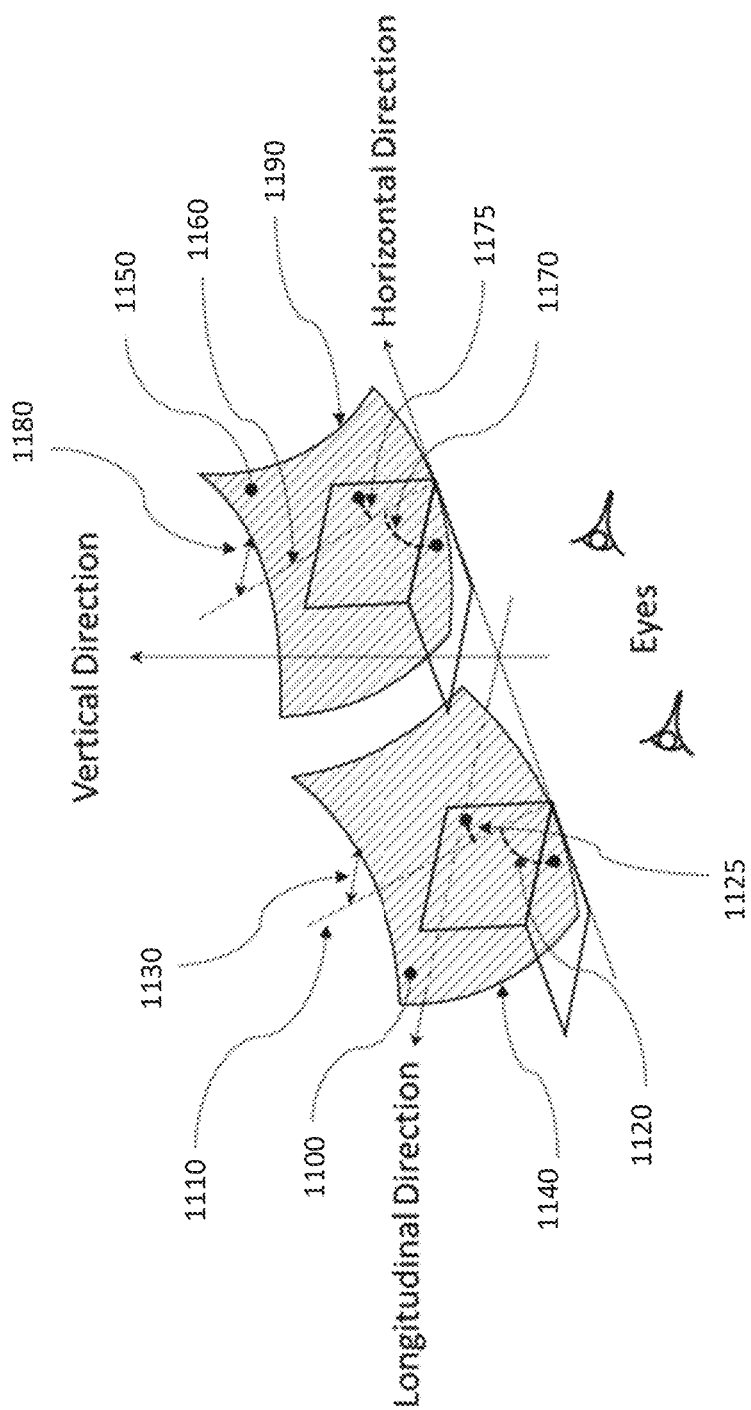
FIG. 11 illustrates two curved displays, according to various embodiments of the present disclosure.

FIG. 11 illustrates two curved displays 1100, 1150, according to various embodiments of the present disclosure. The two curved displays 1100, 1150 make up the image source for an augmented reality system, such as the head-mounted augmented reality system 100 of FIG. 1. The first of the two curved displays 1100 comprises a first axis 1110, a first angle 1120, a second angle 1125, a first radius 1130, and a first base curve 1140. The second of the two curved displays 1150 comprises a second axis 1160, a third angle 1170, a fourth angle 1175, a second radius 1180, and a second base curve 1190. In some embodiments, there may be symmetry between the first of the two curved displays 1100 and the second of the two curved displays 1150.

As illustrated, the two curved displays 1100, 1150 make up an image source. Each of the two curved displays 1100, 1150 has an active displaying area that emits light being reflected by a corresponding optical combiner to a corresponding eye. The surface profile of each surface that is within each active displaying area may be, for example, a cylindrical surface that is formed by swiping the first base curve 1140 and the second base curve 1190 along the first axis 1110 and the second axis 1160, respectively. The surface profile of each surface that is within each active displaying area may be, for example, a toroidal surface that is formed by revolving the first base curve 1140 and the second base curve 1190 around the first axis 1110 and the second axis 1160 with the first radius 1130 and the second radius 1180, respectively. The first axis 1110 and the second axis 1160 form a first angle 1120 and a third angle 1170 with respect to a horizontal reference plane that is parallel to the longitudinal direction and the horizontal direction. Both the first angle 1120 and the third angle 1170, measured in degree, may be any degree that is greater than 0° and less than 90°. Both the first axis 1110 and the second axis 1160 may further form a second angle 1125 and a fourth angle 1175 with respect to a vertical reference plane that is parallel to both the longitudinal direction and the horizontal direction. Both the second angle 1125 and the fourth angle 1175, measured in degree, may be any degree that is greater than or equal to 0° and less than 90°.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

What is claimed is:

1. An augmented reality device comprising two optical combiners, an image source, and a housing structure, wherein:

the two optical combiners are configured to correspond to two eyes of a user respectively, each of the two optical combiners comprising an internal surface for reflecting light from the image source to a respective eye of the user, and an external surface for allowing light from real-world to enter the respective optical combiner, wherein each of the external surface and the internal surface is a freeform surface with a surface function that is based on an XY-polynomial including at least one multivariate monomial, wherein the surface functions of the external surfaces and the internal surfaces of the two optical combiners reads:

$$z = \frac{cr^2}{1 + \sqrt{1-(1+k)c^2r^2}} + \sum c_j x^m y^n$$

where z is a sag of a surface parallel to a z-axis, x and y are coordinates in a coordinate system for the corresponding optical combiner, c is a vertex curvature, k is a conic constant, r equals $$\sqrt{x^2 + y^2},$$

$c_j$ is a coefficient of j-th monomial $x^m y^n$, and m and n are non-negative integers;

each of the surface functions of the external surfaces is optimized by using ray tracing and is based on a design of the corresponding internal surface and a refraction index of a material for the two optical combiners;

each of the two optical combiners comprises a first local curvature on the internal surface corresponding to an outward vision field and a second local curvature on the internal surface corresponding to an inward vision field;

the image source is positioned above the eyes of the user, the image source configured to emit light onto the internal surfaces of the two optical combiners, wherein the image source comprises two active displaying areas which are on two different planes;

the image source comprises two independent display panels respectively corresponding to the eyes of the user;

each of the two active displaying areas is a portion or the entirety of a respective one of the two independent display panels, and each independent display panel is associated with a respective one of the two optical combiners;

the two independent display panels are not coplanar and are arranged with respect to a reference plane formed by a horizontal axis and a longitudinal axis; each of the two independent display panels has a lower edge coinciding with the reference plane; each display surface of the two independent display panels forms a first angle with the reference plane at a lower edge of each independent display panel, wherein the first angle is between forty-five degrees and ninety degrees; wherein each of the lower edges of the two independent display panels forms a second angle with the horizontal axis, wherein the second angle from the horizontal axis to a left display panel of the two independent display panels is counterclockwise, and the second angle from the horizontal axis to a right display panel of the two independent display panels is clockwise; and the housing structure is configured to maintain relative position and orientation of the two optical combiners and the image source.

2. The augmented reality device of claim 1, wherein each of the two active displaying areas is angled, about a vertical axis, an absolute value between zero and forty-five degrees.

3. The augmented reality device of claim 1, wherein each of the active displaying areas is angled, about the longitudinal axis, an absolute value between zero and forty-five degrees.

4. The augmented reality device of claim 1, wherein the image source comprises a Liquid Crystal Display, a Micro-LED display, an Organic Light Emitting Diode display, or an Active-Matrix Organic Light-Emitting Diode display.

5. The augmented reality device of claim 1, wherein:

the internal surface is coated with a partially-reflective-partially-transmissive layer;

the external surface is coated with an anti-reflective layer; and each of the two optical combiners further comprises a translucent substrate between the internal surface and the external surface.

6. The augmented reality device of claim 1, wherein:

the surface function has parameters that include a vertex curvature, a conic constant, and a constant associated with the multivariate monomial, wherein the parameters are each non-zero.

7. The augmented reality device of claim 1, wherein the housing structure further comprises a headband configured to maintain the relative position and orientation of the two optical combiners and the image source relative to the user's head.

8. The augmented reality device of claim 1, wherein the housing structure comprises an optical fixture configured to permit each of the two optical combiners to:

rotate about a horizontal axis to be maintained in a rotated position to reflect light to the respective eye of the user or to hide an augmented image from the respective eye of the user.

9. The augmented reality device of claim 1, wherein the housing structure comprises an optical fixture configured to permit each of the two optical combiners to: be detached from the housing structure.

10. The augmented reality device of claim 1, wherein the housing structure further comprises a film-light valve that controls a level of transparency of a substrate of each of the two optical combiners.

11. The augmented reality device of claim 1, further comprising:
- a computational device connected to the image source, the computational device configured to generate images to be presented by the image source on the internal surfaces of the two optical combiners; and
- a power source configured to provide power to the image source and the computational device.

* * * * *